J. KOSUTZ & J. BUNTA.
TIRE UNWRAPPING MACHINE.
APPLICATION FILED OCT. 27, 1915.
1,196,249.
Patented Aug. 29, 1916.
7 SHEETS—SHEET 6.
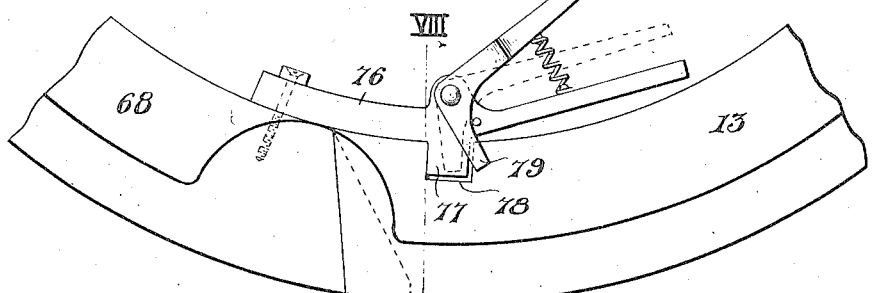
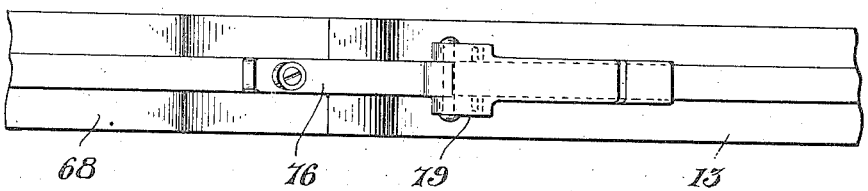
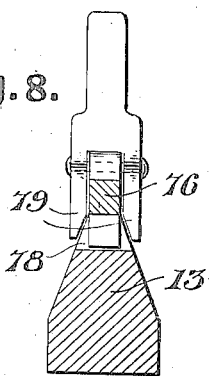
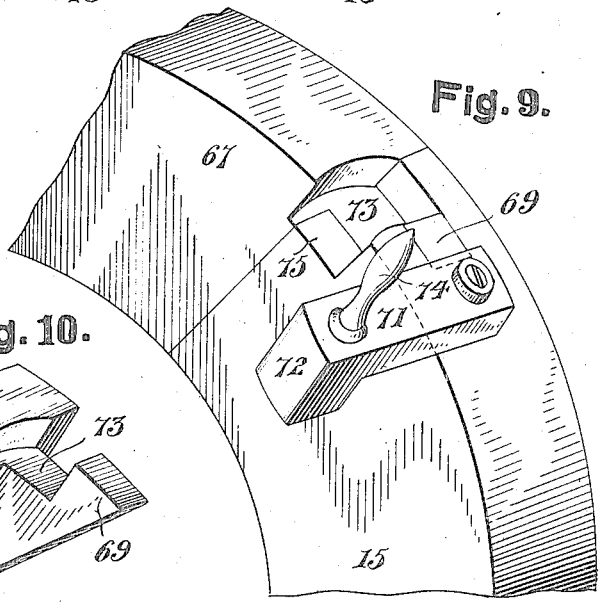
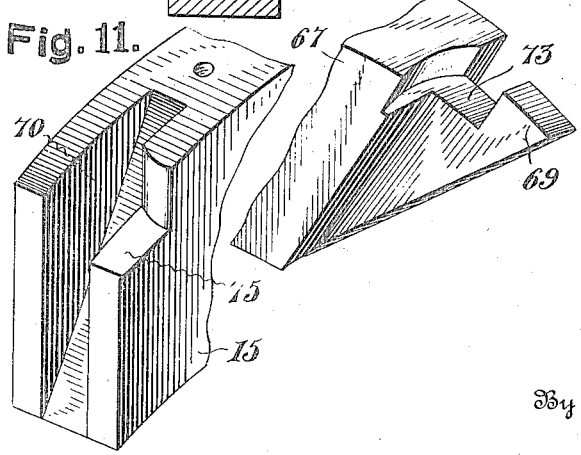
Inventors
John Kosutz
John Bunta
By A. M. Wilson
Attorney

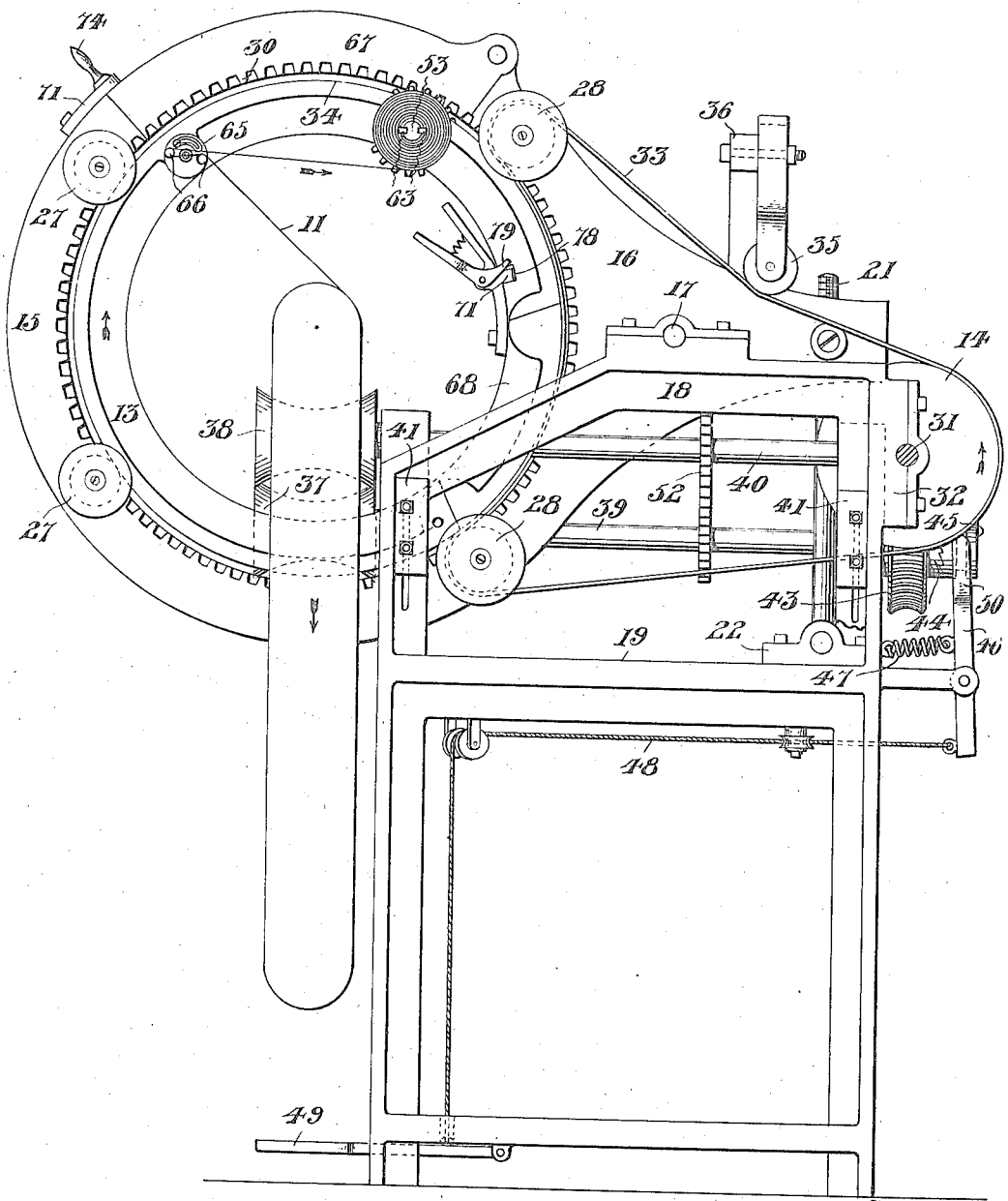

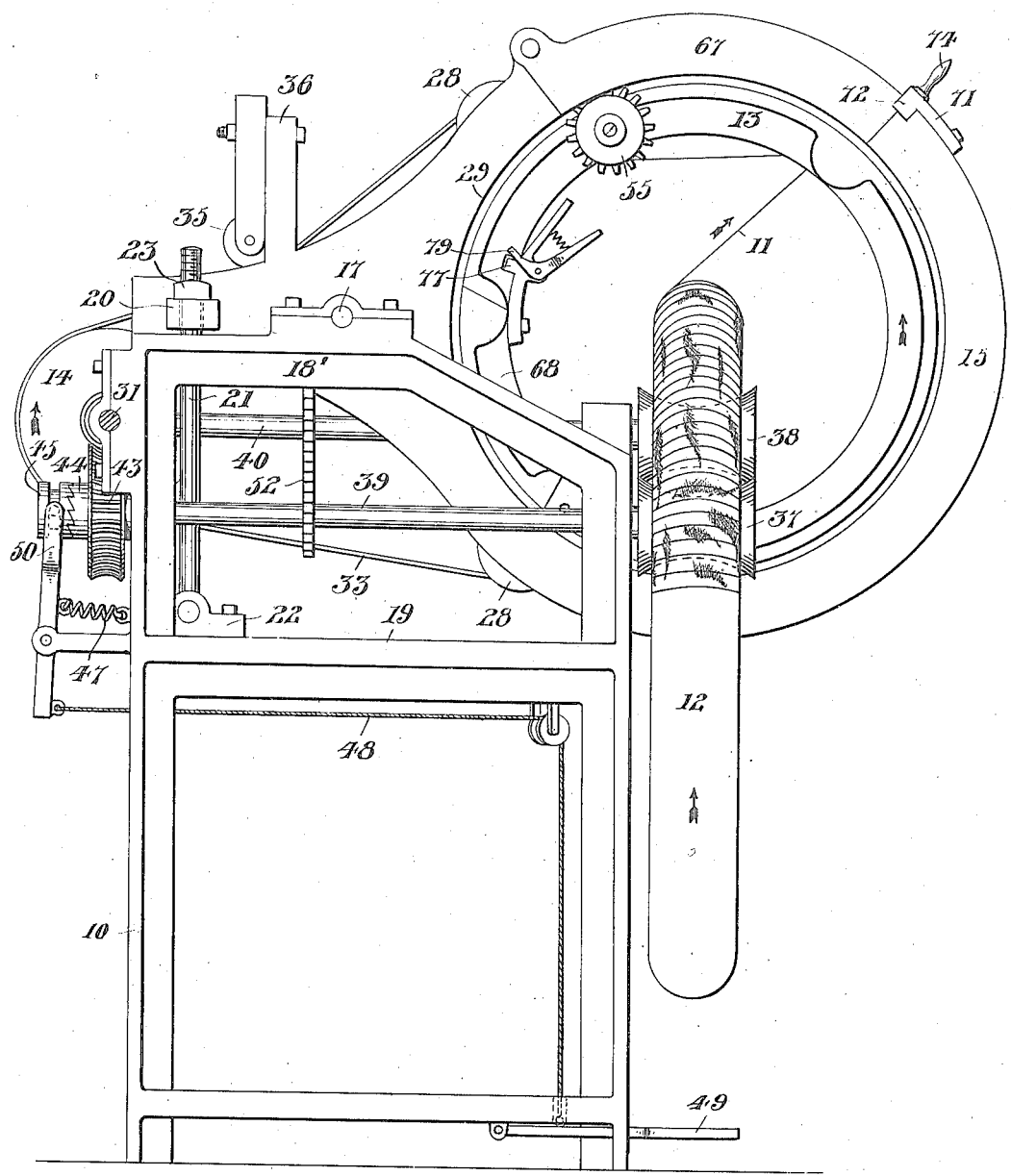

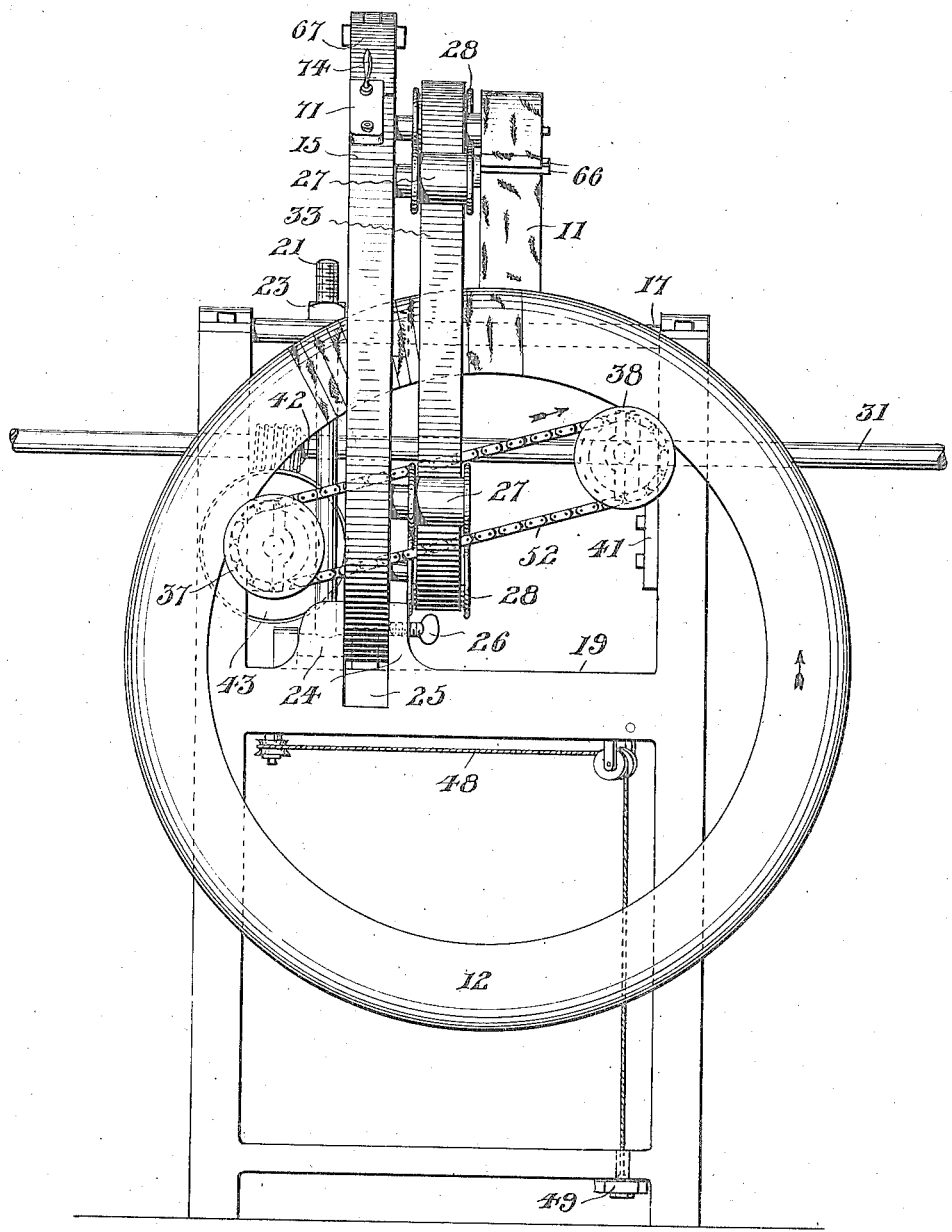

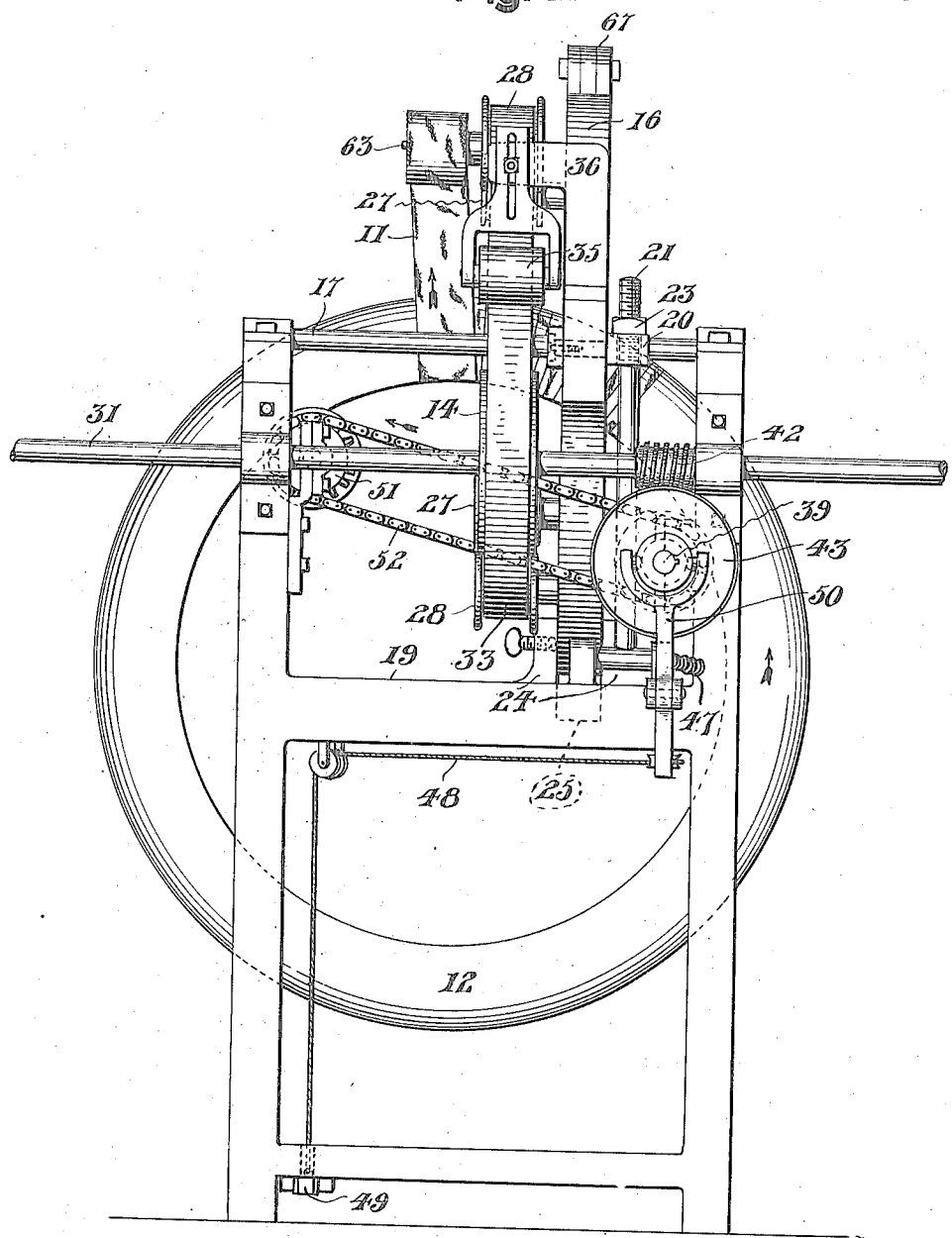

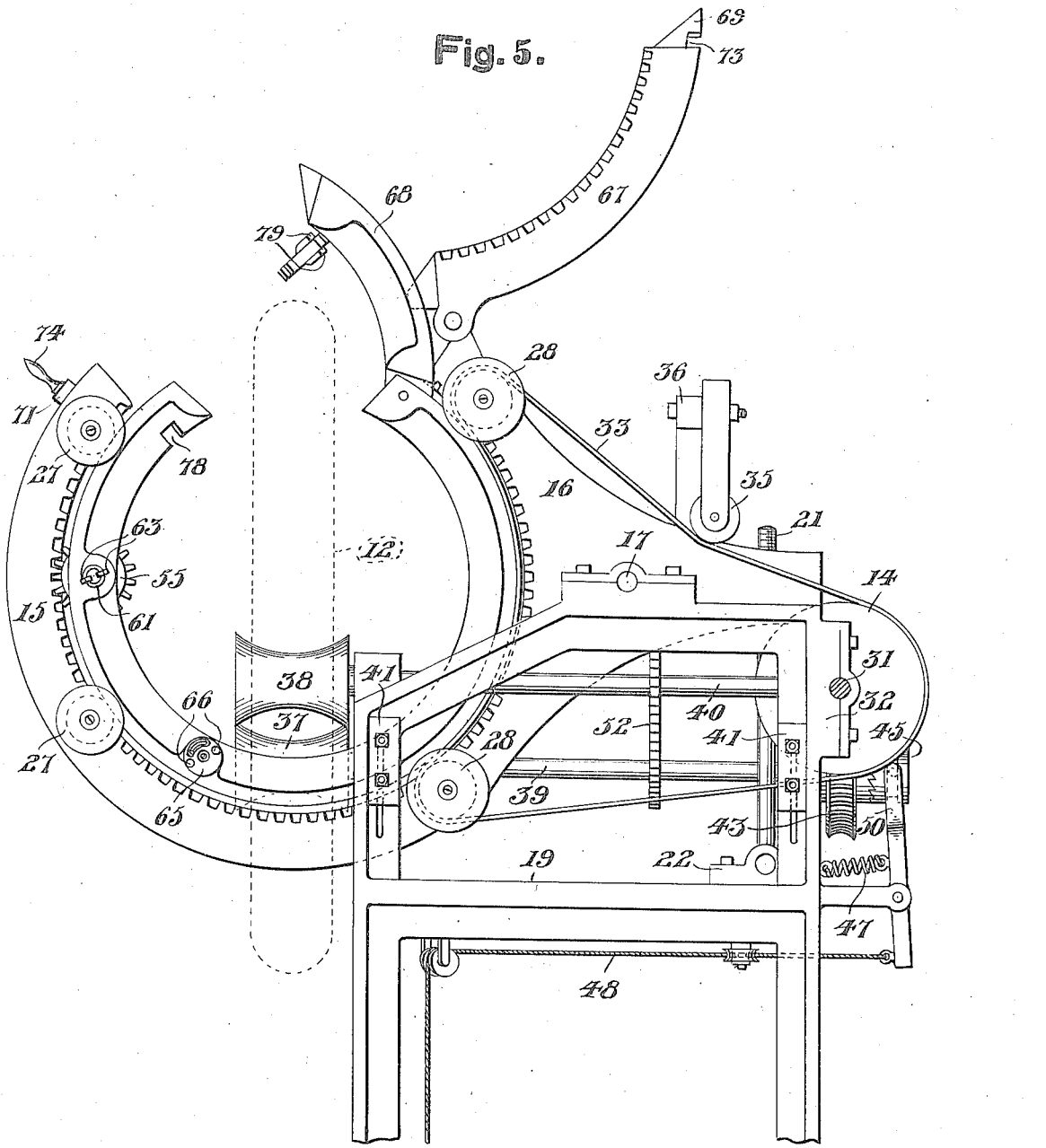

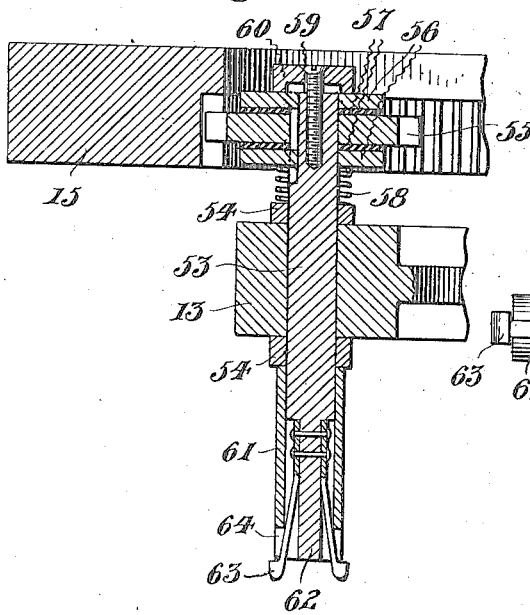
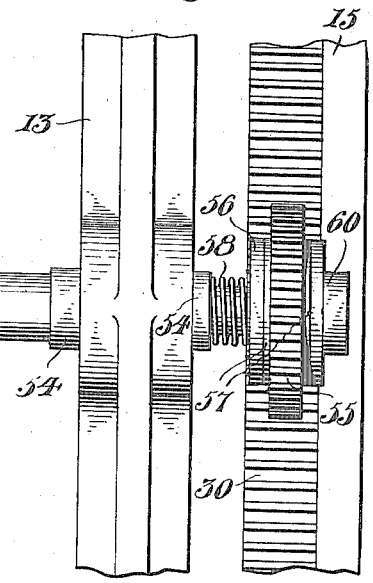
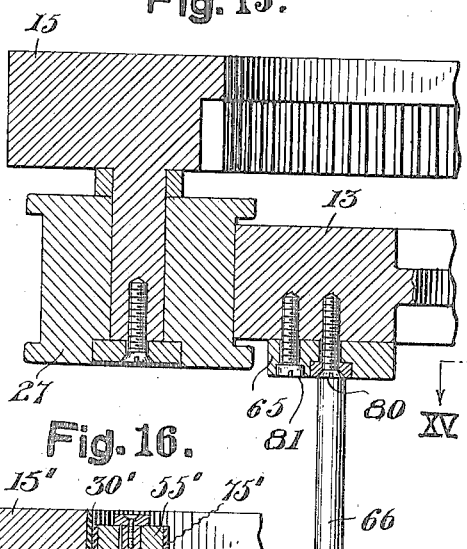
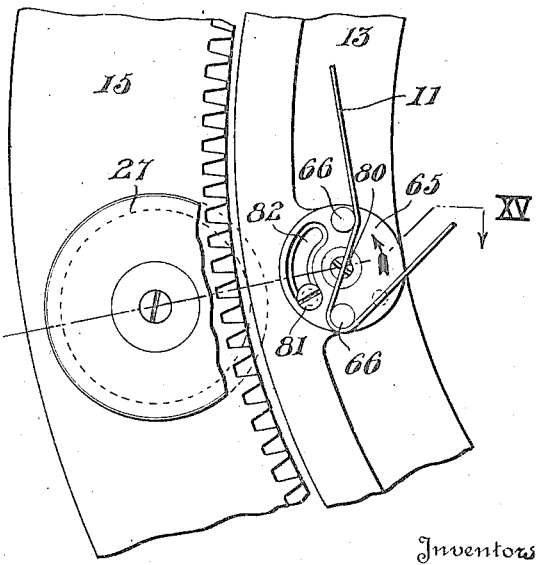
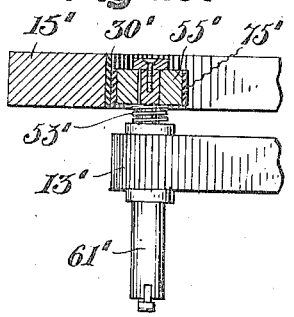

UNITED STATES PATENT OFFICE.

JOHN KOSUTZ AND JOHN BUNTA, OF AKRON, OHIO.

TIRE-UNWRAPPING MACHINE.

1,196,249. Specification of Letters Patent. Patented Aug. 29, 1916.

Application filed October 27, 1915. Serial No. 58,143.

*To all whom it may concern:*

Be it known that we, JOHN KOSUTZ and JOHN BUNTA, subjects of the King of Hungary, residing at Akron, in the county of Summit and State of Ohio, have invented certain new and useful Improvements in Tire-Unwrapping Machines, of which the following is a specification.

This invention relates to certain new and useful improvements in tire unwrapping machines.

It is well understood in the art of tire manufacturing that in the formation of tire casings or shoes formed of rubber that the rubber is formed or molded into proper shape upon the fabric carcass and is then completely enveloped in a fabric winding preparatory to vulcanization.

The primary object of the present invention is to provide a machine for the expeditious removal of such winding from the completed tire after being vulcanized, the winding fabric being deposited upon spools ready for re-use.

While the present invention is primarily adapted for removing such fabric windings from a tire, the same is readily adaptable for wrapping a tire by winding the fabric therearound, such operation being accomplished by a substantial reversal of the aforementioned unwinding operation.

During either the wrapping or unwrapping of the strip of material or fabric proper, provision is made for holding the fabric taut to insure smoothness in operation while means are provided operable simultaneously with the machine for bodily shifting the tire into proper position for being operated upon.

A further object is to provide such a device adapted to receive and revolve an automobile tire while a covering strip thereon is simultaneously unwrapped in a taut condition and deposited upon a receiving spool.

It will be understood that the device may be employed for wrapping and unwrapping other objects than tires and whether the same are circular or elongated in form and that also the device may be employed for wrapping a paper covering around the tire after its completion preparatory to shipping or storing the same.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application and in which like designating characters refer to corresponding parts throughout the several views: Figure 1 is a right-hand side elevation of the device with a tire operatively positioned thereon. Fig. 2 is a left-hand side elevation thereof. Fig. 3 is a front elevation of the same. Fig. 4 is a rear elevation of the device. Fig. 5 is a side elevational view similar to Fig. 1, with the device in its open position and illustrating a tire in dotted lines being removed therefrom. Fig. 6 is an enlarged side elevation of the shuttle catch. Fig. 7 is an interior elevational view of the catch. Fig. 8 is a transverse sectional view taken upon line VIII—VIII of Fig. 6. Fig. 9 is an enlarged perspective detail view of the rack lock. Figs. 10 and 11 are enlarged perspective detail views of the interengaging end portions of the rack. Fig. 12 is an enlarged interior elevational view of a portion of the rack and shuttle showing the spool spindle and the operating means therefor. Fig. 13 is a central longitudinal sectional view through the same taken upon the plane of the axis of the spindle. Fig. 14 is an enlarged side elevation of a portion of the rack and shuttle showing the strip and shuttle guides. Fig. 15 is a transverse sectional view taken upon line XV—XV of Fig. 14, and, Fig. 16 is a detail view partly in elevation and partly in section and illustrating a modified form of the spool operating means.

In referring to the drawings, it will be noted that the device is illustrated in its operation as an unwinding device for tire wrappings and the same broadly consists of a mounting table 10 provided with the mechanism hereinafter described for removing the fabric strip or tape 11 from the rubber tire shoe 12 by unwrapping the same therefrom, it being noted that the direction of movement of the tire and the tape as well as the shuttle 13 and its drive member 14 are illustrated by arrows in the side elevational views, Figs. 1 and 2 of the drawings. A circular bracket 15 shown in the preferred construction in the form of a rack is adjustably mounted upon the table 10 by having a radially-extending arm 16 of the bracket journaled upon a rod 17 carried by opposite frames 18 and 18' mounted respectively upon the right hand and left hand sides of the top 19 of the said table. A perforated block 20 is journaled through the bracket arm 16 rearwardly of the rod 17 and receives an adjusting bolt 21 shiftable therethrough. The bolt 21 is swingingly mounted upon the table top 19 by means of ears 22 while a regulating nut 23 is screw-threaded upon the upper free end of the bolt 21 whereby the bracket 15 may be tilted upon the rod 17 and retained in the desired position. Opposite lugs 24 are provided at the forward edge of the table top 19 for the reception of the bracket 15 therebetween while a receiving notch 25 is also provided in the forward edge of the table top for accommodating the movements of the bracket and a set screw 26 is carried by one of the lugs 24 for engaging the bracket and maintaining the same in its desired lowered position and coöperating with the bolt and nut means heretofore described in maintaining the bracket operatively arranged. By pivotally mounting the bracket arm 16 on the rod 17, the circular rack portion 15 of the bracket may be readily adjusted to cause the tire 12 to pass directly through the central axis thereof, and thereby cause the tape 11 to remain taut at all times. The necessity of pivotally mounting the bracket will at once be understood as tires of different sizes would otherwise pass through the bracket at points off center thereof.

The shuttle 13 is in the form of a ring or annulus mounted for revolution within the grooves of two forwardly and two rearwardly arranged grooved pulleys 27 and 28 respectively carried by the bracket 15, the shuttle being thus mounted in a plane parallel to the rack 15 and concentric with the central circular opening 29 thereof, it being seen that the bracket 15 is provided with a toothed surface 30 upon the inner edge thereof adjacent the said shuttle 13. A power shaft 31 is journaled in opposite brackets 32 at the rear of the frames 18, 18' and is adapted for operation from any source of power supply not shown.

The aforementioned driving member 14 is secured to the power shaft 31 and received an endless belt 33 passing thereover and thence over the rear pulleys 28 and in frictional engagement with the periphery 34 of the shuttle 13 between the said pulleys 28. A take-up roller 35 is shiftably mounted in a bracket 36 carried by the bracket arm 16 and bears against the belt 33 after the manner of a slack adjuster. Upon turning the power shaft 31 in the desired direction, the drive member 14 will be operated for moving the belt 33 in engagement with the shuttle 13, thereby revolving the bobbin relatively of the bracket 15, it being seen that the required frictional tension is maintained upon the belt 33 by retaining the bracket at the desired adjustment by means of the screw 26 and nut 23, although if desired, the take-up roller 35 may be separately adjusted.

Two drums 37 and 38 are arranged for mounting and turning the tire 12, the said drums being secured upon the forward ends of shafts 39 and 40 respectively, which are journaled in parallelism to the opposite frames 18' and 18 respectively of the table top 19, the shaft 40 and drum 38 being positioned in a plane slightly higher than the shaft 39 and drum 37, the said drums being provided with plain curved grooved surfaces for receiving the tire 12 thereon as best illustrated in Figs. 1 and 2 of the drawings. The upper shaft 40 is rendered vertically adjustable upon its mounting frame 18 by means of adjustable blocks 41, whereby the drums 37 and 38 may be inwardly positioned to cause a tire to pass centrally therethrough. After continued operation of the machine, the bracket 15 is caused to sag or slightly move downwardly by its own weight, and the strain upon the winding tape. Instead of readjusting the drums, the bracket may be more readily and conveniently shifted on its pivot by operating the screw 21 to move the bracket to the desired position to cause the tire to pass centrally therethrough.

A worm 42 carried by the shaft 31 is in constant mesh with a worm gear 43 mounted upon a clutch collar 44 journaled upon the lower shaft 39. A shiftable clutch sleeve 45 is splined upon the rear end of the said shaft 39 and is adapted to be maintained in operative engagement with the clutch collar 44 by means of a clutch lever 46 and its operating spring 47. A cord 48 is attached to the lower end of the clutch lever 46 and is connected to a foot pedal 49 whereby the lever 46 may be swung with its upper operating end 50 outwardly positioned and with the clutch sleeve 45 entirely disengaged from the clutch collar 44, in which position the shaft 39 will remain at rest uninfluenced by the continuous operation of the clutch collar 44. The shafts 39 and 40 are each provided with a sprocket wheel 51 over which a sprocket chain 52 is maintained so that the turning of the lower shaft 39 by the power shaft 31 in the manner heretofore set forth, simultaneously turns the upper shaft 40 at the same speed and in the same direction so that the drums 37 and 38 will be operated for slowly revolving the tire 12 in the direction indicated by the arrows in Figs. 1 and 2 of the drawings and the turning of the drive member 14 and the shuttle 13 in the directions also therein shown. A spindle 53 is journaled transversely through the shuttle 13 and is restrained against longitudinal movement by means of oppositely positioned collars 54 carried by the said spindle. A pinion 55 is journaled upon the spindle 53 in mesh with the rack teeth 30. A flexible connection is provided between the pinion 55 and spindle 53 whereby a slipping of the pinion is permitted revolubly upon the spindle 53 whenever said spindle is restrained from rotation, it being understood that the pinion 55 must necessarily rotate whenever the shuttle 13 is turned relatively to the bracket 15. The said flexible connection above referred to is here shown in the form of two disks 56 arranged at opposite sides of the pinion 55 and splined to the spindle 53 so as necessarily to revolve therewith, intervening packing rings 57 being arranged between the disks and the said pinion. An expansion spring 58 is arranged encircling the spindle 53 and bearing between the inner disk 56 and the adjacent spindle collar 54 while a set screw 59 is screw-threaded in the end of the spindle 53 and is adapted to force a terminal washer 60 carried by the end of the spindle into frictional contact with the adjacent disk 56, thus compressing the spring 58 and giving the desired firmness to the connection between the pinion 55 and spindle 53. A spool 61 is removably mounted upon the end 62 of the spindle 53 at the opposite side of the shuttle from the pinion 55 and is removably maintained thereon by means of spring fingers 63 carried by the said spindle end and adapted to engage within notches 64 of the said spool 61, it being understood that by compressing the finger 63, the spool 61 may be readily removed from the spindle.

A take-up bobbin 65 is adjustably carried by the shuttle 13 slightly spaced from the spindle 53 and is provided with opposite parallel guide pins 66 projecting therefrom and over which the tape or covering strip 11 is tensioned intermediate of its travel. The said bobbin 65 is mounted upon a central screw post 80 while a securing screw 81 carried by the shuttle projects through an arcuate slot 82 in the said bobbin, it being evident that the bobbin may be turned and then retained in its adjusted position by means of the screw 81, thus changing the tension upon the strip 11 as may be found desirable.

It has been found in operation that the surface of the tire 12 upon which the covering is being wound or from which the same is being unwound helically must be positioned at substantially the center of the shuttle and bracket, or in other words, the cross-section of the tire at the point of operation is concentric with the shuttle and bracket and the drums 37 and 38 are designed for so supporting the said tire 12 to be operated upon. For allowing the admission of the tire within the shuttle and bracket for seating upon the traveling drums 37 and 38, a hinged section 67 is provided for the bracket 15 and a hinged section 68 for the shuttle 13. The bracket section 67 has its unhinged end provided with a tongue 69 adapted for reception within a groove 70 of the adjacent portion of the bracket while a swinging lock 71 is carried by the bracket and adapted for transverse swinging movement for positioning its angular end 72 within the groove 70 and a corresponding groove 73 of the tongue 69, thus locking the section 67 in its closed position, it being seen that an operating handle 74 is provided for the lock 71 and that a cut-away portion 75 is provided at one side of the groove 70. The hinged section 68 of the shuttle 13 is provided with a swinging latch 76 having an angular portion 77 for positioning within a notch 78 of the adjacent portion of the shuttle while a bifurcated spring-pressed catch 79 is carried by the latch 76 for normally maintaining the latch in its closed position with the shuttle forming a complete annulus. It will thus be seen that the tire 12 may be readily removed from the machine by releasing the lock 71 and latch 76 and swinging open the shuttle section 68 and bracket section 67 in the manner best illustrated in Fig. 5 of the drawings, whereupon the tire 12 may be readily elevated and removed while a new tire may be quickly arranged to take its place in operative position upon the drums, and the shuttle and bracket sections then closed.

In operating the machine for unwinding the covering strip 11, the tire 12 is placed in position as illustrated in the first four figures of the drawings and the strip 11 is adjusted over the guide pins 66 and its free end secured to the spool 61. Upon applying power to the shaft 31, the shuttle 13 is revolved in the direction indicated by the arrows which will carry the take-up bobbin 65 and the spindle 53 around and through the tire 12 upon the repeated revolutions of the shuttle. The meshing of the pinion 55 with the teeth 30 of the stationary bracket 15 simultaneously revolves the pinion 55 during any movement of the shuttle 13 and such operation of the pinion 55 turns the spindle 53 and the spool 61 for winding the strip 11 upon the said spool. For preventing any breaking of the strip 11 by this winding of the strip upon the spool 61, the pinion 55 is resiliently mounted for rotation upon the spindle in the manner hereinbefore described and as best illustrated in Figs. 12 and 13 of the drawings and the gear ratio between the teeth of the pinion 55 and the rack teeth 30 is such as to provide a greater rapidity of revolution of the pinion 55 than is necessary for winding the same upon the spool 61 so that the tensioning of the strip 11 between the spool and the tire 12 and over the guide pins 66 is assured. The revolving of the shaft 31 also revolves the mounting drums 37 and 38 in the manner hereinbefore described which effects a slow revolution of the tire 12 for positioning the unwrapping portion of the strip 11 in substantially the same vertical plane as the take-up bobbin 65 and spool 61 at all times during the unwinding operation of the device. The pedal 49 may be employed whenever the speed of rotation of the tire 12 is too great and moves the unwinding portion of the tape out of the proper alinement so that by means of the said pedal 49 the position of the tire 12 is regulated as desired.

The completely vulcanized tire having its envelop wrapping thereon may be thus positioned upon the present machine and the machine put in operation and the wrapping strip 11 completely unwound therefrom and reeled upon the spool 61 and the spool removed from the spindle 53 by depressing the spring fingers 63 so that the strip 11 may be again used upon another tire. When desired to wrap the strip 11 helically around a tire 12, the filled spool 61 is positioned upon the spindle 53 and the strip 11 fed over the guide pin 66 and the free end of the strip attached to the surface of the tire 12. The power shaft 31 is then revolved in a reverse direction and the strip 11 will be helically wrapped so as to completely envelop the tire 12 and the strip 11 will be suitably maintained under the proper tension for wrapping the same tightly around the tire by means of the resilient mounting of the operating pinion 55 upon the spool spindle 53 as heretofore described. The device therefore fulfils the objects for which it is intended and will readily wrap or unwrap a tire shoe, feeding the tire shoe along simultaneously with the wrapping or unwrapping operation. Elongated members such as cables may also be wrapped or unwrapped by the present device by longitudinally and shiftably mounting the same in any desired manner substantially axially of the shuttle 13 and bracket 15.

For rendering the operation of the device more noiseless, it will in some instances, be found desirable to substitute a friction drive connection between the spool spindle 53 and the bracket 15. This variation is illustrated in Fig. 16 of the drawing in which the bracket 15' is provided with a leather or other form of facing strip 30' while the pinion 55' has a covering 75' in frictional contact therewith. The spool 61' is removably mounted upon the spindle 53', which spindle is journaled through the shuttle 13', the wheel 55' having a resilient journaling connection with the spindle similar to the mounting of the pinion 53 hereinbefore described.

While the form of the invention herein shown and described is what is believed to be the preferred embodiment thereof, it is nevertheless to be understood that various forms, modifications and arrangements of the parts may be made without departing from the spirit and scope of the invention as claimed.

What we claim as new is:—

1. A device of the class described, comprising a pivotally mounted circular bracket having a hinged entrance closure section, the said bracket being adjustable to cause a tire to pass centrally therethrough, an annular shuttle revolubly mounted upon the said bracket and arranged concentric therewith and at one side thereof and having a hinged entrance closure portion, and a covering strip supporting means carried by the said shuttle.

2. A device of the class described, comprising a pivotally mounted circular bracket having a hinged entrance closure section, the said bracket being adjustable to cause a tire to pass centrally therethrough, an annular shuttle revolubly mounted upon the said bracket and arranged concentric therewith and at one side thereof and having a hinged entrance closure portion, tire shifting means mounted adjacent said bracket, simultaneous operating means for the said shuttle and shifting means, and supporting means for a tire cover strip carried by the said shuttle.

3. A device of the class described, comprising a pivotally mounted circular bracket having a closable tire entrance portion, the said bracket being adjustable to cause a tire to pass centrally therethrough, an annular shuttle rotarily mounted upon the said bracket and having the same axial line therewith and provided with a closable tire receiving opening portion, the said bracket and shuttle having the adjacent sides encircled by a rubber tire, and supporting means for a covering strip carried by the said shuttle.

4. A device of the class described, comprising a pivotally mounted circular bracket having a closable tire entrance portion, the said bracket being adjustable to cause a tire to pass centrally therethrough, an annular shuttle rotarily mounted upon the said bracket and having the same axial line therewith and provided with a closable tire receiving opening portion, the said bracket and shuttle adapted to have the adjacent sides encircled by a rubber tire, supporting means for a covering strip carried by the said shuttle, supporting drums for the tire, and simultaneously operating means for the said drums and shuttle.

5. A device of the class described, comprising a pivotally mounted circular bracket having a closable tire entrance portion, the said bracket being adjustable to cause a tire to pass centrally therethrough, an annular shuttle rotarily mounted upon the said bracket and having the same axial line therewith and provided with a closable tire receiving opening portion, the said bracket and shuttle adapted to have the adjacent sides encircled by a rubber tire, supporting means for a covering strip carried by the said shuttle, supporting drums for the tire, a power shaft, operative connections between the said shaft and shuttle, gear connections between the said shaft and drums, and a foot operated releasing clutch for the said gear connections.

6. A device of the class described, comprising a table, a transverse rod carried by the said table, a bracket, an arm carried by the bracket and journaled upon the said rod, the said bracket with a circular opening therein having an inner bearing surface and provided with a hinged closure portion, adjusting means connecting the top of the said table and the rear end of the said bracket arm, locking means for the said bracket positioned at the forward side of the said table top, and a tire covering feeding bobbin operatively carried by the said rack adjacent the bearing surface thereof.

7. A device of the class described, comprising a table, a transverse rod carried by the said table, a bracket, an arm carried by the bracket and journaled upon the said rod, the said bracket with a circular opening therein having an inner bearing surface and provided with a hinged closure portion, adjusting means connecting the top of the said table and the rear end of the said bracket arm, locking means for the said bracket positioned at the forward side of the said table top, grooved pulleys arranged in pairs upon one side of the said bracket forwardly and rearwardly of the said opening therein, a circular shuttle mounted for rotation within the grooves of the said pulleys and having a hinged entrance closure portion adapted for arrangement in alinement with the hinged portion of said bracket, a power shaft, a disk secured to the said shaft, an endless belt operatively positioned over the said disk and running over the rearward pair of said grooved pulleys and in frictional contact with the periphery of the said shuttle intermediate the said rear pulleys, and a tire wrapper supporting means carried by the said shuttle and operatively engaging the said bearing surface of the said bracket.

8. A device of the class described, comprising a table, a transverse rod carried by the said table, a bracket, an arm carried by the bracket and journaled upon the said rod, the said bracket with a circular opening therein having an inner bearing surface and provided with a hinged closure portion, adjusting means connecting the top of the said table and the rear end of the said rack arm, locking means for the said bracket positioned at the forward side of the said table top, a shuttle associated with said bracket, a spindle journaled through the said shuttle, a removable winding spool upon one end of the said spindle, and a driving gear resiliently and frictionally journaled upon the other end of the said spindle and in operative contact with the said bearing surface of the bracket.

9. A device of the class described, comprising a table, a transverse rod carried by the said table, a bracket, an arm carried by the bracket and journaled upon the said rod, the said bracket with a circular opening therein having an inner bearing surface and provided with a hinged closure portion, adjusting means connecting the top of the said table and the rear end of the said bracket arm, locking means for the said bracket positioned at the forward side of the said table top, grooved pulleys arranged in pairs upon one side of the said bracket forwardly and rearwardly of the said opening therein, a circular shuttle mounted for rotation within the grooves of the said pulleys and having a hinged entrance closure portion adapted for arrangement in alinement with the hinged portion of said rack, a power shaft, a disk secured to the said shaft, an endless belt operatively positioned over the said disk and running over the rearward pair of said grooved pulleys and in frictional contact with the periphery of the said shuttle intermediate the said rear pulleys, a spindle journaled through the said shuttle, a removable winding spool upon one end of the said spindle, and a driving gear resiliently and frictionally journaled upon the other end of the said spindle and in operative contact with the said bearing surface of the bracket.

10. A device of the class described, comprising a table, a transverse rod carried by the said table, a bracket, an arm carried by the bracket and journaled upon the said rod, the said bracket with a circular opening therein having an inner bearing surface and provided with a hinged closure portion, adjusting means connecting the top of the said table and the rear end of the said bracket arm, locking means for the said bracket positioned at the forward side of the said table top, a shuttle associated with said bracket, a spindle journaled through the said shuttle, a removable winding spool upon one end of the said spindle, a driving gear resiliently and frictionally journaled upon the other end of the said spindle and in operative contact with the said bearing surface of the bracket tire mounting drums upon the said table at opposite sides of the said bracket and shuttle, power means for the said shuttle, and disengagable operative connections between the said drums and power means.

11. A device of the class described, comprising a table, a transverse rod carried by the said table, a bracket, an arm carried by the bracket and journaled upon the said rod, the said bracket with a circular opening therein having an inner bearing surface and provided with a hinged closure portion, adjusting means connecting the top of the said table and the rear end of the said bracket arm, locking means for the said bracket positioned at the forward side of the said table top, grooved pulleys arranged in pairs upon one side of the said bracket forwardly and rearwardly of the said opening therein, a circular shuttle mounted for rotation within the grooves of the said pulleys and having a hinged entrance closure portion adapted for arrangement in alinement with the hinged portion of said bracket, a power shaft, a disk secured to the said shaft, an endless belt operatively positioned over the said disk and running over the rearward part of said grooved pulleys and in frictional contact with the periphery of the said shuttle intermediate the said rear pulleys, a spindle journaled through the said shuttle, a removable winding spool upon one end of the said spindle, a driving gear resiliently and frictionally journaled upon the other end of the said spindle and in operative contact with the said bearing surface of the bracket tire mounting drums upon the said table at opposite sides of the said bracket and shuttle, power means for the said shuttle, and disengageable operative connections between the said drums and power means.

12. A wrapping and unwrapping machine for tires comprising a pivotally mounted circular bracket and a circular shuttle encircling a tire, the said bracket being adjustable to cause a tire to pass centrally therethrough, pulleys projecting laterally of said bracket for revolubly supporting the shuttle, and a tensioned take-up bobbin for a wrapping strip carried by said shuttle and operatively connected to the said bracket.

13. A wrapping and unwrapping machine for applying fabric strips to tires comprising a pivotally mounted circular bracket and a circular shuttle encircling a tire, the said bracket being adjustable to cause a tire to pass centrally therethrough, pulleys projecting laterally of said bracket for revolubly supporting the shuttle, a tensioned take-up bobbin for the wrapping strip carried by the said shuttle and operatively connected to the said bracket, traveling supporting means for the tire, and simultaneously operating means for the said shuttle and supporting means.

14. An unwrapping machine comprising a pivotally mounted circular bracket, the said bracket being adjustable to cause a tire to pass centrally therethrough, a circular shuttle revolubly mounted upon the said bracket, a spindle journaled through the said shuttle, a pinion frictionally journaled upon one end of said spindle and in operative engagement with the said bracket, a strip spool removably mounted on the other end of the said spindle, and a driving belt having a portion thereof in frictional contact with a portion of the periphery of the shuttle to revolve the shuttle.

15. A wrapping and unwrapping machine for tires comprising a pivotally-mounted bracket, adapted to be adjusted to cause a tire to pass centrally therethrough, a shuttle, pulleys carried by the bracket for revolubly supporting the shuttle, a driving pulley, a driving belt passing thereover and over a pair of said pulleys, with the portion of the belt extending between the two pulleys in frictional contact with the shuttle periphery.

16. A wrapping and unwrapping machine for tires comprising a pivotally-mounted bracket, adapted to be adjusted to cause a tire to pass centrally therethrough, a shuttle, pulleys carried by the bracket for revolubly supporting the shuttle, tire supporting rollers within the periphery of the shuttle, a power shaft, and means operated by the power shaft for revolving the shuttle and the supporting rollers.

17. A wrapping and unwrapping machine for tires comprising a pivotally mounted bracket, adapted to be adjusted to cause a tire to pass centrally therethrough, a shuttle rotatably mounted on said bracket, a strip spool carried by said shuttle and in operative engagement with said bracket, and a driving belt frictionally engaging a portion of the shuttle.

18. A wrapping and unwrapping machine for tires comprising a pivotally mounted bracket, adapted to be adjusted to cause a tire to pass centrally therethrough, a shuttle rotatably carried thereby, a pair of vertically adjustable tire supports, and unitary driving means for the tire supports and shuttle.

In testimony whereof we affix our signatures.

JOHN KOSUTZ.
JOHN BUNTA.